United States Patent
Rebollo Pimentel et al.

(10) Patent No.: US 11,886,216 B2
(45) Date of Patent: Jan. 30, 2024

(54) VOLTAGE REGULATOR CIRCUIT AND METHOD FOR REGULATING A VOLTAGE

(71) Applicant: NXP B.V., Eindhoven (NL)

(72) Inventors: Ivan Jesus Rebollo Pimentel, Graz (AT); Thomas Pichler, Graz (AT); Ronald van Langevelde, Waalre (NL)

(73) Assignee: NXP B.V., Eindhoven (NL)

( * ) Notice: Subject to any disclaimer, the term of this patent is extended or adjusted under 35 U.S.C. 154(b) by 176 days.

(21) Appl. No.: 17/453,218

(22) Filed: Nov. 2, 2021

(65) Prior Publication Data

US 2023/0135571 A1    May 4, 2023

(51) Int. Cl.
*G05F 1/575* (2006.01)
*G06K 19/07* (2006.01)
*H02H 9/04* (2006.01)

(52) U.S. Cl.
CPC ......... *G05F 1/575* (2013.01); *G06K 19/0715* (2013.01); *H02H 9/04* (2013.01)

(58) Field of Classification Search
CPC .......... G05F 1/575; G05F 1/468; G05F 1/613; G05F 3/242; G06K 19/0715; H02H 9/04
See application file for complete search history.

(56) References Cited

U.S. PATENT DOCUMENTS

| | | | |
|---|---|---|---|
| 4,127,885 A | 11/1978 | Adam et al. | |
| 5,260,644 A | 11/1993 | Curtis | |
| 5,444,358 A | 8/1995 | Delepaut | |
| 5,465,188 A | 11/1995 | Pryor et al. | |
| 6,075,353 A * | 6/2000 | Johnson | G05F 1/613 |
| | | | 363/16 |
| 6,141,193 A | 10/2000 | Mercer | |
| 6,466,422 B2 | 10/2002 | Luo | |
| 6,580,257 B2 | 6/2003 | Marty | |
| 6,631,066 B1 * | 10/2003 | Smith | G05F 1/613 |
| | | | 361/103 |

(Continued)

FOREIGN PATENT DOCUMENTS

| | | | | |
|---|---|---|---|---|
| EP | 1973069 A1 * | 9/2008 | ......... | G06K 19/0701 |
| JP | 2013003699 A | 1/2013 | | |

OTHER PUBLICATIONS

Cantalice, Rafael et al.; "Non-Linear Shunt Regulator With RF Power Detector for RFID Applications"; 2020 IEEE International Conference on RFID (RFID); Sep. 28-Oct. 16, 2020, Orlando, Florida; DOI: 10.1109/RFID49298.2020.9244827.

(Continued)

*Primary Examiner* — Tuyen K Vo
(74) *Attorney, Agent, or Firm* — Daniel D. Hill

(57) ABSTRACT

A voltage regulator is provided. The voltage regulator includes a shunt transistor and a feedback circuit. The shunt transistor has a first current electrode coupled to a first voltage source terminal, a second current electrode coupled to a second voltage source terminal, a control electrode coupled to receive a reference voltage, and a body electrode. The feedback circuit has an input terminal coupled to the body electrode of the shunt transistor, and an output terminal coupled to the control electrode of the shunt transistor. The voltage regulator is suitable for use in a passive RFID device to protect the device from over-voltage damage. In another embodiment, a method for regulating a voltage is provided.

20 Claims, 5 Drawing Sheets

(56) References Cited

U.S. PATENT DOCUMENTS

| | | | |
|---|---|---|---|
| 6,720,754 B2 | 4/2004 | Nakashimo | |
| 7,129,771 B1 | 10/2006 | Chen | |
| 7,362,165 B1 | 4/2008 | Chen | |
| 7,423,416 B1 | 9/2008 | Quinones et al. | |
| 7,602,161 B2 | 10/2009 | Mcleod | |
| 7,649,402 B1 | 1/2010 | Chen | |
| 7,847,619 B1 | 12/2010 | Chen | |
| 7,978,005 B1* | 7/2011 | Hyde | G05F 3/242 327/543 |
| 8,169,203 B1* | 5/2012 | Vemula | G05F 1/575 323/273 |
| 8,588,682 B2 | 11/2013 | Wilson | |
| 8,648,578 B2* | 2/2014 | Zhao | G05F 1/571 323/273 |
| 9,197,059 B2 | 11/2015 | Wilson | |
| 10,551,860 B2 | 2/2020 | Yasusaka | |
| 2004/0233771 A1 | 11/2004 | Shor et al. | |
| 2004/0239304 A1 | 12/2004 | Perez | |
| 2007/0046430 A1* | 3/2007 | Yamazaki | G06K 19/0723 342/118 |
| 2007/0206338 A1 | 9/2007 | Ishino | |
| 2008/0170417 A1* | 7/2008 | Yang | G05F 1/613 323/223 |
| 2009/0146624 A1* | 6/2009 | Kim | G05F 1/613 323/271 |
| 2009/0267585 A1* | 10/2009 | Liu | H03F 3/195 330/277 |
| 2010/0078488 A1* | 4/2010 | Nagatsuka | G06K 19/0723 327/143 |
| 2010/0097042 A1 | 4/2010 | Hsieh | |
| 2010/0181985 A1* | 7/2010 | Inoue | G05F 3/16 323/311 |
| 2012/0200272 A1* | 8/2012 | Le Fevre | G05F 1/613 323/265 |
| 2012/0313592 A1* | 12/2012 | Ochoa | G05F 1/613 323/223 |
| 2013/0050886 A1* | 2/2013 | Fan | H02H 9/046 361/56 |
| 2013/0141151 A1* | 6/2013 | Ochoa | H03H 19/004 327/284 |
| 2014/0077788 A1 | 3/2014 | Vemula | |
| 2014/0218827 A1* | 8/2014 | Inukai | G06F 1/26 361/18 |
| 2016/0154415 A1* | 6/2016 | Bîzîitu | G05F 1/575 323/280 |
| 2016/0187900 A1 | 6/2016 | Dhiman et al. | |

OTHER PUBLICATIONS

Chen, Jiann-Jong et al.; "Low-quiescent-current fast-response current-feedback shunt regulator"; APCCAS 2008-2008 IEEE Asia Pacific Conference on Circuits and Systems; Nov. 30-Dec. 3, 2008, Macao, China; DOI: 10.1109/APCCAS.2008.4746077.

Cheng, Yaping et al.; "A High-Sensivity Current-Shunt Monitor With Extended Input Common-Mode Voltage Range"; 2017 2nd IEEE International Conference on Integrated Circuits and Microsystems (ICICM); Nov. 8-11, 2017, Nanjing, China; DOI: 10.1109/ICAM.2017.8242129.

Cortes, Fernando Paixao et al.; "A Power Management System Architecture for LF Passive RFID Tags"; 2014 IEEE 5th Latin American Symposium on Circuits and Systems; Feb. 25-28, 2014, Santiago, Chile; DOI: 10.1109/LASCAS.2014.6820279.

Van Langevelde, R. et al. "Physical Background of MOS Model 11"; Unclassified Report Koninklijke Philips Electronics N.V. Apr. 2003.

U.S. Appl. No. 17/445,752, filed Aug. 24, 2021; Inventors: Thomas Pichler, et al.; "Voltage Limiter".

* cited by examiner

VOLTAGE REGULATOR CIRCUIT AND METHOD FOR REGULATING A VOLTAGE

BACKGROUND

Field

This disclosure relates generally to electronic circuits, and more particularly, to a voltage regulator circuit and method for regulating a voltage.

Related Art

Radio Frequency Identification (RFID) refers to a wireless system comprised of two components: a tag and a reader. The reader is a device that has one or more antennas that emit radio waves and receive signals back from the RFID tag. Tags, which use radio waves to communicate their identity and other information to nearby readers, can be passive or active. Passive RFID tags are powered by the reader and do not have a battery. Active RFID tags are powered by batteries. RFID is a wireless communication technology that acts over short to medium distances for two-way communication. The use of RFID tags is growing in several markets, including the medical, consumer, retail, industrial, automotive, smart grid markets, logistics and avionics. Due to internal or external factors such as distance from the other device or tag, nearby objects, etc. the tag needs to be tuned to balance the impedance to optimize the received signal strength before a data read cycle starts. Further, the internal components of a tag need to be protected from overvoltage.

Current shunt regulators are mainly composed of a voltage reference, a resistive divider, and an operational amplifier to achieve a relatively constant regulated voltage independently of the shunt current. The required area and power consumption of such an implementation makes it generally unsuitable for RFID applications.

Therefore, what is needed is a voltage regulator for RFID applications that has relatively lower complexity, lower power consumption, and reduced surface area.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
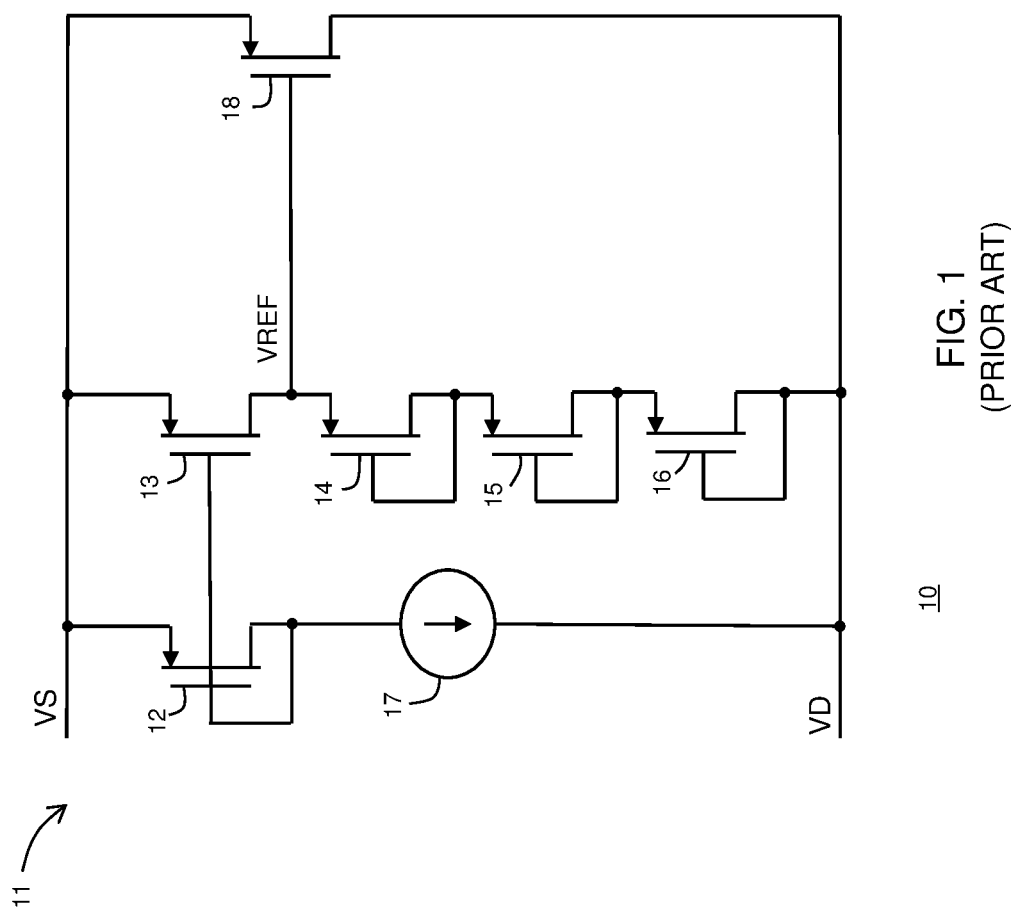
FIG. 1 illustrates a voltage limiter circuit in accordance with the prior art.

Generally, there is provided, a voltage regulator circuit for limiting and regulating a voltage source for a passive RFID application. The voltage regulator includes a feedback circuit that monitors a relatively weak avalanche current between a body terminal and a drain of a P-channel metal-oxide semiconductor field-effect transistor (MOSFET) shunt transistor. The feedback is applied to the gate of the shunt transistor to cancel threshold voltage and high output impedance variations and keep the voltage source regulated.

The voltage regulator allows a reduction of a geometry and associated parasitic components of the shunt transistor. Additionally, the feedback circuit, based on the weak-avalanche current of the MOSFET shunt transistor, guarantees lower temperature and process variations and a smaller spread of local distributions.

For an RFID application, the voltage regulator allows a dynamically field dependent compensation, which not only eases the protection of an RFID device against over-voltage damage, but also allows the control of key parameters as input impedance and return link field strength.

In accordance with an embodiment, there is provided, a voltage regulator circuit including: a shunt transistor having a first current electrode coupled to a first voltage source terminal, a second current electrode coupled to a second voltage source terminal, a control electrode coupled to receive a reference voltage, and a body electrode; and a feedback circuit having an input coupled to the body electrode of the shunt transistor, and an output terminal coupled to the control electrode of the shunt transistor. The feedback circuit may further include: a first current mirror having an input terminal coupled to the body electrode of the shunt transistor, and an output terminal; and a second current mirror having an input terminal coupled to the output terminal of the first current mirror, and an output terminal coupled to the control electrode of the shunt transistor. The shunt transistor may include a metal-oxide semiconductor field-effect transistor (MOSFET), wherein a relatively weak avalanche current between the body electrode and the first current electrode may be used to apply a feedback current to the shunt transistor. The voltage regulator circuit may further include a voltage reference circuit coupled between the first and second voltage source terminals, and an output terminal for providing the reference voltage. The voltage regulator circuit may further include: an amplifier having a first input terminal coupled to the output terminal of the voltage reference circuit, a second input terminal, and an output terminal coupled to the control electrode of the shunt transistor; and a resistor divider coupled between the first voltage source terminal and the second voltage source terminal, the resistor divider having an output terminal coupled to the second input terminal of the amplifier. The output terminal of the feedback circuit may be coupled to one or more amplifiers, the resistor divider, and the voltage reference circuit. The voltage regulator circuit may be implemented in a radio frequency identification (RFID) tag or integrated circuit. The RFID tag or integrated circuit may be a passive device powered by an electromagnetic field generated by an active RFID device. The voltage regulator circuit may further include a voltage reference circuit for providing the reference voltage, the voltage reference circuit comprising: a current mirror having a first terminal coupled to the first voltage source, a second terminal coupled to a current source, and an output terminal; and a plurality of series-connected diodes having a terminal of a first diode of the plurality of series-connected diodes coupled to the output terminal of the current mirror, and a terminal of a last diode of the plurality of series-connected diodes coupled to the second voltage source.

In another embodiment, there is provided, a voltage regulator circuit including: a voltage reference circuit coupled between a first voltage source terminal and second voltage source terminal, and an output terminal for providing a reference voltage; a shunt transistor having a first current electrode coupled to the first voltage source terminal, a second current electrode coupled to a second voltage source terminal, a control electrode coupled to receive a reference voltage, and a body electrode; and a feedback circuit having an input terminal coupled to the body electrode of the shunt transistor, and an output terminal coupled to the control electrode of the shunt transistor. The feedback circuit may further include: a first current mirror having an input terminal coupled to the body electrode of the shunt transistor, and an output terminal; and a second current mirror having an input terminal coupled to the output terminal of the first current mirror, and an output terminal coupled to the control electrode of the shunt transistor. The voltage regulator circuit may further include a voltage reference circuit for providing the reference voltage, the voltage reference circuit including: a current mirror having a first terminal coupled to the first voltage source terminal, a second terminal coupled to a current source, and an output terminal; and a plurality of series-connected diodes having a terminal of a first diode of the plurality of series-connected diodes coupled to the output terminal of the current mirror, and a terminal of a last diode of the plurality of series-connected diodes coupled to the second voltage source terminal. The shunt transistor may include a metal-oxide semiconductor field-effect transistor (MOSFET), wherein a relatively weak avalanche current between the body electrode and the first current electrode may be used to apply a feedback current to the shunt transistor. The voltage regulator circuit may further include: an amplifier having a first input terminal coupled to the output terminal of the voltage reference circuit, a second input terminal, and an output terminal coupled to the control electrode of the shunt transistor; and a resistor divider coupled between the first voltage source terminal and the second voltage source terminal, the resistor divider having an output terminal coupled to the second input terminal of the amplifier. The output terminal of the feedback circuit may be coupled to one or more of the amplifier, the resistor divider, and the voltage reference circuit.

In yet another embodiment, there is provided, a method for regulating a voltage in a radio frequency identification (RFID) circuit, the method including: providing a reference voltage to a control electrode of a shunt transistor having a first current electrode coupled to a first voltage source terminal and a second current electrode coupled to a second voltage source terminal; and providing a feedback path from a body terminal of the shunt transistor to the control electrode of the shunt transistor, wherein the feedback path reduces current caused by the reference voltage at the control electrode of the shunt transistor to keep a source voltage between the first and second voltage source terminals relatively constant. Providing a feedback path may further include: mirroring a current at the body electrode of the shunt transistor with a first current mirror to produce a first output current; mirroring the first output current from the first current mirror with a second current mirror to produce a second output current; and providing the second output current to the control electrode of the shunt transistor. The shunt transistor may be a metal-oxide semiconductor field-effect transistor (MOSFET), wherein a relatively weak avalanche current between the body electrode and the first current electrode may be used to forward bias the shunt transistor. The method may be implemented in a voltage regulator circuit in a radio frequency identification (RFID) tag or integrated circuit. The RFID tag or integrated circuit may be a passive device powered by an electromagnetic field generated by an active RFID device.

RFID tags can store a range of information from one serial number to several pages of data. RFID tags can be mobile so that they can be hand carried, or they can be mounted on a post or overhead. RFID systems can also be built into the architecture of a cabinet, room, or building. NFC is a technology based on RFID technology. NFC technology can be used to provide peer-to-peer communication or one way communication. When two NFC enabled devices are very close to each other, about 4 cm or less, they can communicate with each other using the radio waves. Of the two devices communicating using NFC, at least one of them has to be an active device (powered). In many cases, the powered RFID device may be a smartphone, tablet, security pad, or a payment terminal. The other device can be either active or passive (unpowered). NFC is one among many other RFID technologies. For example, RAIN RFID, by the RAIN Alliance, is the adoption of ultra-high frequency (UHF) RFID technology in a way similar to other wireless technology organizations including NFC Forum, WiFi Alliance and Bluetooth SIG. RAIN RFID uses the GS1 UHF Gen2 protocol which ISO/IEC has standardized as 18000-63. RAIN RFID is intended as a nod to the link between UHF RFID and the cloud, where RFID-based data can be stored, managed and shared via the internet. A RAIN RFID solution uses a reader to read and write a tagged item, manage the data and take action. RAIN RFID tags are either attached to or embedded in items. Tagged items store and send information. RAIN RFID readers have antenna(s) for either short or long range communication.

In an active peer-to-peer (P2P) mode, two active devices can create a wireless communication channel between them. Also, an active device, with an external power supply, can power a passive device with the electromagnetic field generated by the active device and create a wireless communication channel. NFC passive devices are used in many applications because the passive NFC device can be a simple tag. NFC devices communicate with each other via radio waves. The active NFC device has to be enabled (turned on) first. The radio waves for NFC are generated using an antenna. NFC works by exploiting the properties of electromagnetic fields, using the inductive coupling between NFC devices. NFC devices operate at 13.56 MHz, which is a license-free section of HF on the RF spectrum. RAIN RFID devices operate in a range from 800 MHz to 1 GHz.

The strength of the received signal may be dependent of the distance as well as external factors such as nearby objects, human touch, etc. Therefore, in some examples, RFID tags may include a switchable capacitor bank that includes a plurality of capacitors coupled with switches. The value of the capacitor may be changed by turning one or more of these switches on or off. The input impedance of the receiver antenna may be changed by changing the capacitor value to optimize the signal strength of the input signal. A voltage limiter is used to limit the input voltage to a predefined level to protect internal components of the RFID tag from overvoltage. Typically, voltage limiter circuits for low power RFID applications consume relatively high amounts of current even when the input voltage is below the predefined voltage level.

Figure 3:
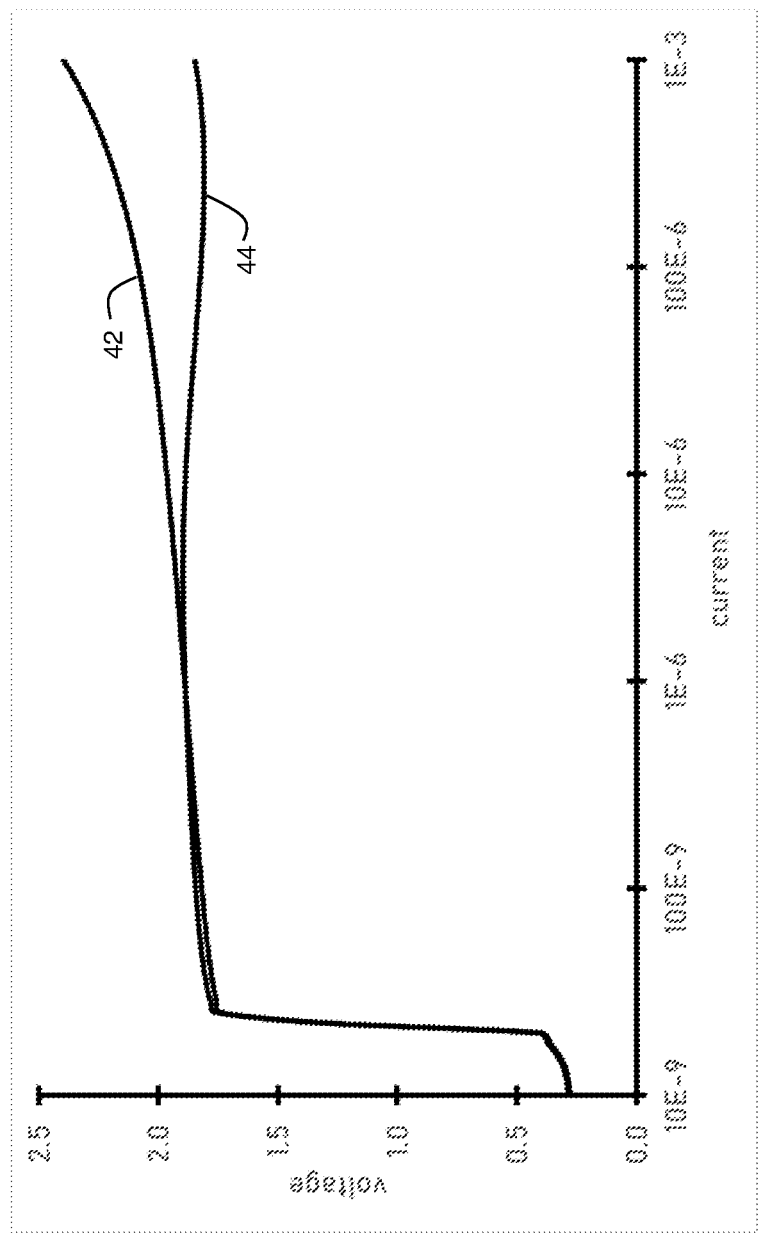
FIG. 3 illustrates a graph for input voltage and current sunk by the prior art voltage limiter of FIG. 1 and the voltage regulator of FIG. 2.

FIG. 1 illustrates voltage limiter circuit 10 in accordance with the prior art. Voltage limiter circuit 10 includes voltage reference circuit 11 and shunt transistor 18. Voltage reference circuit 11 includes a current mirror comprising diode-connected P-channel transistor 12 and P-channel transistor 13. Voltage reference circuit 11 also includes a current source 17 and a plurality of P-channel series-connected and diode-connected transistors 14, 15, and 16. All of the transistors of voltage limiter circuit 10 are P-channel MOSFETs. A reference voltage VREF provided by voltage reference circuit 11 is provided to a gate of shunt transistor 18 to control a shunt current as a function of a voltage provided at voltage terminals VS and VD. A voltage versus current waveform plot 42 in FIG. 3 shows that the voltage of voltage limiter circuit 10 drifts up as current increases. Voltage limiter circuit 10 provides almost no voltage regulation at higher current.

Figure 2:
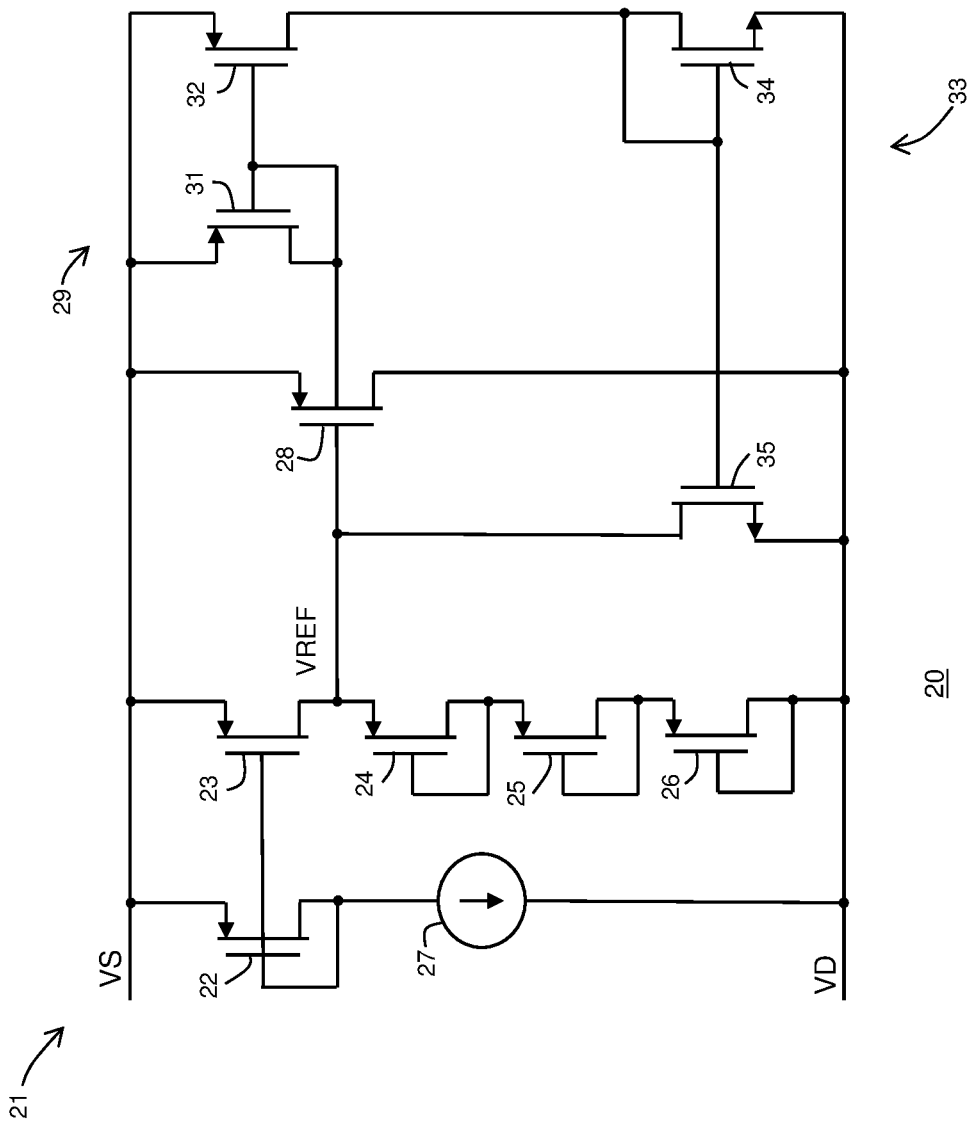
FIG. 2 illustrates a voltage regulator circuit in accordance with an embodiment.

FIG. 2 illustrates voltage regulator circuit 20 in accordance with an embodiment. Voltage regulator circuit 20 includes voltage reference circuit 21, shunt transistor 28, and a feedback circuit including current mirror 29 and current mirror 33. Voltage reference circuit 21 is similar to voltage reference circuit 11 of FIG. 1 and includes P-channel transistors 22-26 and current source 27. Transistors 22 and 23 form a current mirror and transistors 24-26 are connected in series and are diode-connected, having their gates connected to their drains. All the transistors of voltage reference circuit 21 are P-channel transistors. Like voltage limiter 10, voltage regulator 20 provides reference voltage VREF to the gate of shunt transistor 28 as a function of the voltage source provided at terminals VS and VD. The voltage source may be provided inductively or radiatively from an active RFID device or reader. A feedback path from the body terminal of shunt transistor 28 to the gate of shunt transistor 28 includes current mirrors 29 and 33. The body terminal may be a bulk terminal or a well terminal depending on the semiconductor manufacturing process. Current mirror 29 of the feedback path includes P-channel transistors 31 and 32 and current mirror 33 includes N-channel transistors 34 and 35. Shunt transistor 28 includes a source (first current electrode) connected to a first voltage source terminal labeled "VS", a drain (second current electrode) connected to a second voltage source terminal labeled "VD", a gate (control electrode) connected to a drain of transistor 23, and a body terminal. Note that voltage regulator circuit 20 is constructed using complementary metal-oxide semiconductor (CMOS) transistors. In other embodiments, voltage regulator circuit 20 can be constructed from different transistor types. The voltage provided at the first and second voltage terminals may be produced by an electromagnetic field of an active RFID device. P-channel transistor 31 has a source connected to voltage source terminal VS, and a gate and a drain connected to the body terminal of shunt transistor 28. P-channel transistor 32 has a source connected to voltage source terminal VS, a gate connected to the gate of transistor 31, and a drain. Diode-connected N-channel transistor 34 has a gate and a drain connected to the drain of transistor 32, and a source connected to second voltage source VD. N-channel transistor 35 has a source connected to the gate of shunt transistor 28, a gate connected to the gate and drain of transistor 34, and a drain connected to voltage source terminal VD. Except for shunt transistor 28, all the other transistors in voltage regulator circuit 20 have their body terminals connected in a conventional manner and therefore are not shown in FIG. 2. For example, the P-channel transistors have their body terminals tied to their source terminals and the N-channel transistors have their body terminals tied to their source terminals.

For a MOSFET biased in saturation, such as shunt transistor 28, the electric field at the drain side may reach very high values. In this case, electrons travelling through the channel from source to drain are accelerated and gain so much energy that they can create extra electron-hole pairs by exciting electrons from the valence band into the conduction band. The generated electrons and holes are collected by the drain and body terminal, respectively. In this way, an avalanche of free carriers may arise, and the initial flux of carriers is multiplied until, possibly, a complete breakdown occurs in the transistor. In a typical MOSFET during normal operation, only low-level avalanche multiplication or weak avalanche occurs and may result in a significant body current, assuming that all the generated holes are collected by the body terminal. When this happens, the drain current is no longer equal to the channel current. The drain current ($I_D$) is now equal to the channel current ($I_{DS}$) plus a body current ($I_B$). That is, $I_D=I_{DS}+I_B$. The body current $I_B$ is formed by an avalanche current which is proportional to the channel current $I_{DS}$. The ratio between $I_{DS}$ and $I_B$ depends on an electron impact ionization coefficient per unit length which is a strong function of the lateral electric field. This coefficient is higher for electrons (n) than for holes (p), therefore the effect of body current is more severe in NMOS than in PMOS. Generally, a difference between the proportional body current and the channel current is from one to several orders of magnitude dependent on the process technology, oxide thickness, and other geometrical parameters. Above a certain drain-source voltage, the channel current of shunt transistor 28 can be monitored by measuring the body current. This process dependent high ratio between the channel and body currents allows the channel current to be approximated using the body current and the drain current with a small error. The relatively weak avalanche current from the body of the shunt transistor is used to apply a feedback current to the gate of the shunt transistor.

For a CMOS implementation such as shown in FIG. 2, one embodiment uses a diode-connected metal-oxide semiconductor (MOS) transistor to mirror the current. By using the relation between the channel and body currents, diode-connected MOS transistor 31 can therefore be used to monitor the current through the body to the drain. The diode forces a forward biasing condition, which slightly modifies the proportionality between the currents and changes the device operating point.

Voltage regulator 20 is based on voltage limiter 10. To provide regulated behavior from voltage regulator 20, current mirrors 29 and 33 provide a feedback path from the body terminal of shunt transistor 28 to the gate of shunt transistor 28. The feedback path pulls current from the gate of shunt transistor 28 and prevents the source voltage from drifting up due to the increased shunt current. FIG. 3 shows a graph comparing plot 42 from voltage limiter 10 to plot 44 of voltage regulator 20. This voltage increase for voltage limiter 10 comes from the high output impedance of the shunt transistor. The voltage increase is reduced in voltage regulator 20 by the feedback current. The gate feedback that is provided to shunt transistor 28 is built by pulling out a proportional current of the body current from a VREF node of voltage reference circuit 21. This proportional current may be a multiple or a sub-multiple of the body current. The feedback current pulls current from the reference voltage circuit 21 in order to compensate the gate voltage to keep the source voltage relatively constant for a wide current range of shunt transistor 28. This feedback provides the voltage regulator function for voltage regulator 20.

FIG. 3 illustrates a graph for the source voltage by the prior art voltage limiter 10 of FIG. 1 and voltage regulator 20 of FIG. 2. The source voltage is derived by rectifying the voltage received inductively from an external reader. A voltage limiter, such as voltage limiter 10, is typically used after the input rectifier stage so that the downstream components can be protected from overvoltage. The overvoltage may occur when the RFID tag is brought into a relatively higher field strength region near the reader. RFID tags are low power devices and a current of even a few nano amperes sunk by the typical voltage limiter at lower voltages may inhibit the operations of the RFID tag by depriving the other components of the power. For example, a memory reading operation may require a minimum amount of power which may not be available if the voltage limiter starts to sink current at voltages lower than a predefined voltage level. Using voltage regulator 20 instead of a voltage limiter reduces this problem. Plot 42 depicts the I-V (current-voltage) characteristics of voltage limiter circuit 10. Plot 44 depicts the I-V characteristics of voltage regulator 20. As can be seen, the use of the feedback path from the body of the shunt transistor of voltage regulator 20 provides a much flatter I-V characteristic than voltage limiter 10. Also, voltage regulator 20 provides the advantages of reduced shunt transistor size and higher robustness against process and temperature variations.

Figure 4:
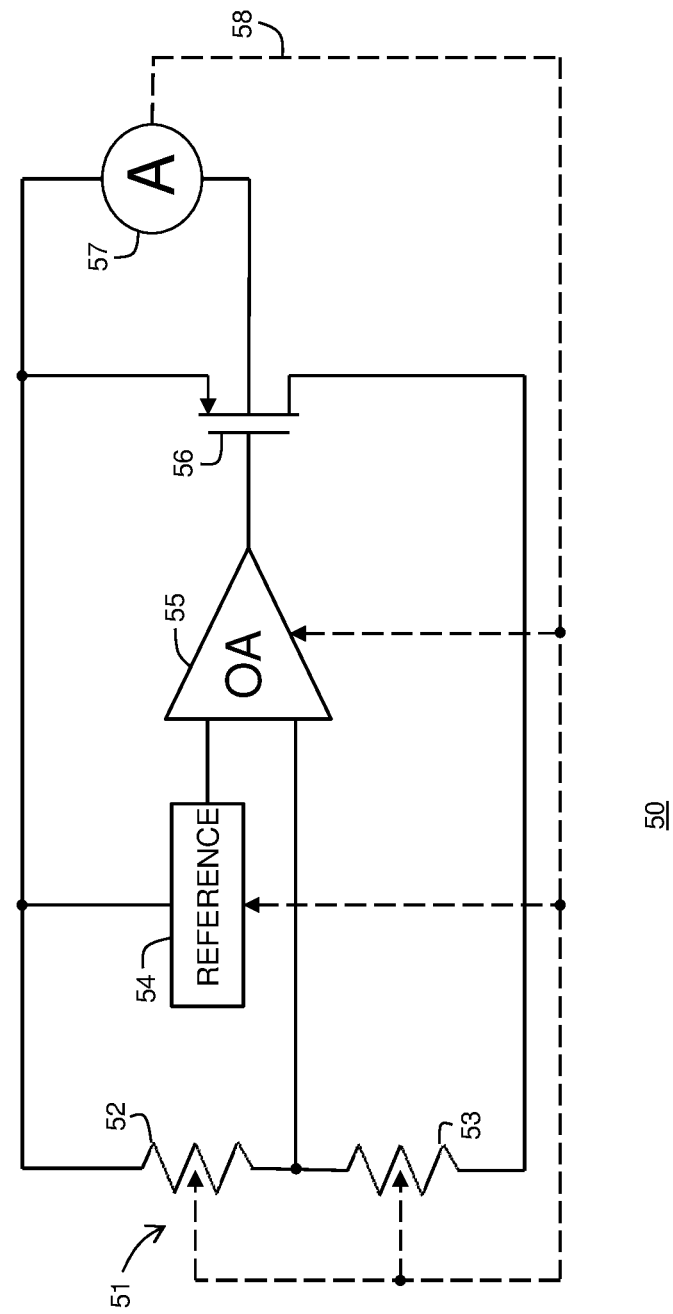
FIG. 4 illustrates a voltage regulator circuit in accordance with another embodiment.

In other embodiments, both the body current monitoring element and the feedback can be included in other voltage limiter circuits by a person skilled in the art. For instance, the current may be monitored as a voltage drop in a particular impedance being captured by an amplifier, such as an operational amplifier, error amplifier, or the like, to generate a suitable voltage to bias the shunt transistor gate to achieve the regulation. For example, FIG. 4 illustrates a voltage regulator circuit 50 in accordance with another embodiment. Voltage regulator circuit 50 includes resistor divider 51, voltage reference 54, operational amplifier 55, shunt transistor 56, and current monitor 57. Resistor divider 51 includes resistors 52 and 53.

As can be seen, voltage regulator circuit 50 is a complete conventional shunt regulator scheme adapted to have the feedback path starting from the body of shunt transistor 56. The feedback voltage can be applied in some or all individual components of voltage regulator 50 to achieve the regulation. This is illustrated in FIG. 4 with a dashed line from current monitor 57 to amplifier 55, reference 54, and resistor divider 51. In one embodiment, current monitor 57 and the feedback circuit may be implemented similarly to diode-connected transistor 31 in FIG. 2.

However, the more complex the circuit, the less suitable it becomes for RFID tag use, as area and power consumption increases substantially. Note that the described embodiments can be used in a reversed complementary MOS implementation, with an NMOS current sinking transistor instead of the illustrated PMOS current sinking transistor.

Figure 5:
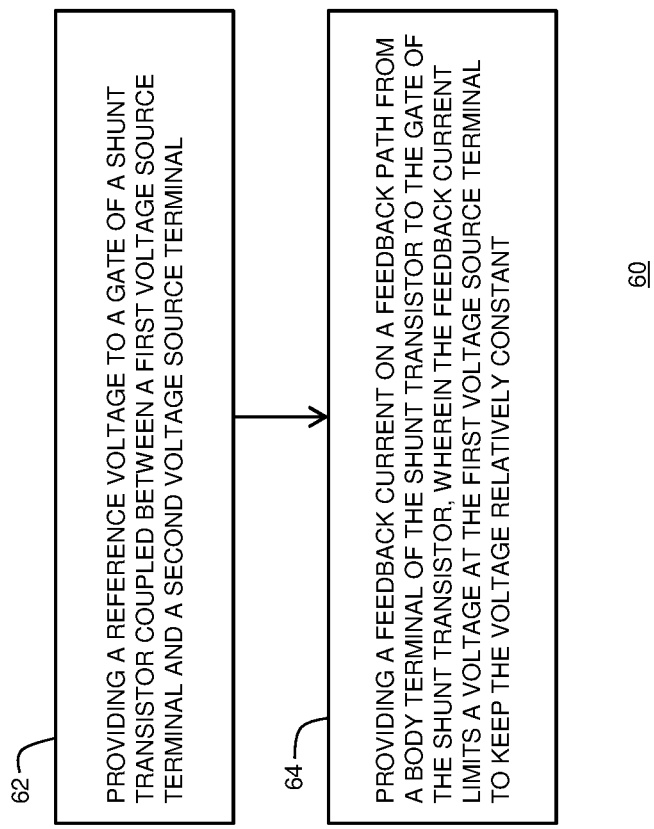
FIG. 5 illustrates a method for regulating a voltage in accordance with an embodiment.

FIG. 5 illustrates method 60 for regulating a voltage in a circuit in accordance with an embodiment. Method 60 begins at step 62. At step 62, a reference voltage is provided to a gate (control electrode) of a shunt transistor. The shunt transistor has a first drain/source terminal (first current electrode) coupled to a first voltage source terminal, and a second drain/source terminal (second current electrode) coupled to a second voltage source terminal. At step 64, a feedback current is provided on a feedback path from a body terminal of the shunt transistor to the gate of the shunt transistor. The feedback path reduces current caused by the reference voltage at the gate of the shunt transistor. This keeps a source voltage between the first and second voltage source terminals relatively constant.

Compared to conventional voltage limiter 10, voltage regulator 20 provides a more regulated output voltage without greatly increasing to complexity of the circuit. The more regulated output voltage allows more energy to be retained in an RFID device and is only limited by the technology, not by the available current. Also, the feedback provided to the gate of the shunt transistor provides a "boosting" effect which increases drive capability and allows the size of the shunt transistor to be reduced. In addition to the reduced size, the feedback provides better robustness against process and temperature variations and the effects of inherent parasitic components of shunt transistor 28.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A voltage regulator circuit comprising:
    a shunt transistor having a first current electrode coupled to a first voltage source terminal, a second current electrode coupled to a second voltage source terminal, a control electrode coupled to receive a reference voltage, and a body electrode; and
    a feedback circuit having an input coupled to the body electrode of the shunt transistor, and an output terminal coupled to the control electrode of the shunt transistor.

2. The voltage regulator circuit of claim 1, wherein the feedback circuit further comprises:
    a first current mirror having an input terminal coupled to the body electrode of the shunt transistor, and an output terminal; and a second current mirror having an input terminal coupled to the output terminal of the first current mirror, and an output terminal coupled to the control electrode of the shunt transistor.

3. The voltage regulator circuit of claim 1, wherein the shunt transistor comprises a metal-oxide semiconductor field-effect transistor (MOSFET), wherein a relatively weak avalanche current between the body electrode and the first current electrode is used to apply a feedback current to the shunt transistor.

4. The voltage regulator circuit of claim 1, further comprising a voltage reference circuit coupled between the first and second voltage source terminals, and an output terminal for providing the reference voltage.

5. The voltage regulator circuit of claim 4, further comprising:
   an amplifier having a first input terminal coupled to the output terminal of the voltage reference circuit, a second input terminal, and an output terminal coupled to the control electrode of the shunt transistor; and
   a resistor divider coupled between the first voltage source terminal and the second voltage source terminal, the resistor divider having an output terminal coupled to the second input terminal of the amplifier.

6. The voltage regulator circuit of claim 5, wherein the output terminal of the feedback circuit is coupled to one or more amplifiers, the resistor divider, and the voltage reference circuit.

7. The voltage regulator circuit of claim 1, wherein the voltage regulator circuit is implemented in a radio frequency identification (RFID) tag or integrated circuit.

8. The voltage regulator circuit of claim 7, wherein the RFID tag or integrated circuit is a passive device powered by an electromagnetic field generated by an active RFID device.

9. The voltage regulator circuit of claim 1, further comprising a voltage reference circuit for providing the reference voltage, the voltage reference circuit comprising:
   a current mirror having a first terminal coupled to the first voltage source, a second terminal coupled to a current source, and an output terminal; and
   a plurality of series-connected diodes having a terminal of a first diode of the plurality of series-connected diodes coupled to the output terminal of the current mirror, and a terminal of a last diode of the plurality of series-connected diodes coupled to the second voltage source.

10. A voltage regulator circuit comprising:
    a voltage reference circuit coupled between a first voltage source terminal and second voltage source terminal, and an output terminal for providing a reference voltage;
    a shunt transistor having a first current electrode coupled to the first voltage source terminal, a second current electrode coupled to a second voltage source terminal, a control electrode coupled to receive the reference voltage, and a body electrode; and
    a feedback circuit having an input terminal coupled to the body electrode of the shunt transistor, and an output terminal coupled to the control electrode of the shunt transistor.

11. The voltage regulator circuit of claim 10, wherein the feedback circuit further comprises:
    a first current mirror having an input terminal coupled to the body electrode of the shunt transistor, and an output terminal; and
    a second current mirror having an input terminal coupled to the output terminal of the first current mirror, and an output terminal coupled to the control electrode of the shunt transistor.

12. The voltage regulator circuit of claim 10, further comprising a voltage reference circuit for providing the reference voltage, the voltage reference circuit comprising:
    a current mirror having a first terminal coupled to the first voltage source terminal, a second terminal coupled to a current source, and an output terminal; and
    a plurality of series-connected diodes having a terminal of a first diode of the plurality of series-connected diodes coupled to the output terminal of the current mirror, and a terminal of a last diode of the plurality of series-connected diodes coupled to the second voltage source terminal.

13. The voltage regulator circuit of claim 10, wherein the shunt transistor comprises a metal-oxide semiconductor field-effect transistor (MOSFET), wherein a relatively weak avalanche current between the body electrode and the first current electrode is used to apply a feedback current to the shunt transistor.

14. The voltage regulator circuit of claim 10, further comprising:
    an amplifier having a first input terminal coupled to the output terminal of the voltage reference circuit, a second input terminal, and an output terminal coupled to the control electrode of the shunt transistor; and
    a resistor divider coupled between the first voltage source terminal and the second voltage source terminal, the resistor divider having an output terminal coupled to the second input terminal of the amplifier.

15. The voltage regulator circuit of claim 14, wherein the output terminal of the feedback circuit is coupled to one or more of the amplifier, the resistor divider, and the voltage reference circuit.

16. A method for regulating a voltage in a radio frequency identification (RFID) circuit, the method comprising:
    providing a reference voltage to a control electrode of a shunt transistor having a first current electrode coupled to a first voltage source terminal and a second current electrode coupled to a second voltage source terminal; and
    providing a feedback path from a body terminal of the shunt transistor to the control electrode of the shunt transistor, wherein the feedback path reduces current caused by the reference voltage at the control electrode of the shunt transistor to keep a source voltage between the first and second voltage source terminals relatively constant.

17. The method of claim 16, wherein providing a feedback path further comprises:
    mirroring a current at the body electrode of the shunt transistor with a first current mirror to produce a first output current;
    mirroring the first output current from the first current mirror with a second current mirror to produce a second output current; and
    providing the second output current to the control electrode of the shunt transistor.

18. The method of claim 16, wherein the shunt transistor is a metal-oxide semiconductor field-effect transistor (MOSFET), wherein a relatively weak avalanche current between the body electrode and the first current electrode is used to forward bias the shunt transistor.

19. The method of claim 16, wherein the method is implemented in a voltage regulator circuit in a radio frequency identification (RFID) tag or integrated circuit.

20. The method of claim 19, wherein the RFID tag or integrated circuit is a passive device powered by an electromagnetic field generated by an active RFID device.

* * * * *